3,481,621
SPRUNG SWINGING STEERING AXLES
Karl-Heinz Griesenbrock, Duisburg, Germany, assignor to Eaton Yale & Towne G.m.b.H., Velbert, Rhineland, Germany, a corporation of Germany
Filed Nov. 2, 1967, Ser. No. 680,114
Claims priority, application Germany, Dec. 8, 1966, Y 1,130
Int. Cl. B62d 7/00; B60g 11/16
U.S. Cl. 280—95
11 Claims

ABSTRACT OF THE DISCLOSURE

A steering axle of a lift truck is mounted to swing about an axle pivot pin that is arranged in the longitudinal truck axis, and that is itself mounted to pivot about a transverse secondary pin near one end of the axle pivot pin. By pivoting about the transverse pin, the axle pivot pin and axle will have substantial movements in a vertical direction. The axle pivot pin is mounted to slide endwise while its end which is remote from the transverse secondary pin is in contact with an inclined surface on the truck frame. A coil spring encircling the axle pivot pin acts between that pin and the axle to press the pin endwise, so that the axle pin by its spring pressure acting against the inclined frame surface will control vertical yielding of the axle. The construction requires little room on the truck while permitting the use of steering linkage, and in one form the transverse secondary pivot is a ball joint in aligned but spaced relation to the axle pivot pin, allowing room for the steering linkage so as to form an axle construction that is extremely low. At one end of the spring there may be a load cell for actuating a load indicating instrument.

---

The invention relates to a sprung swinging steering axle, in particular for vehicles such as fork lift trucks, with the axle mounted to pivot about a pin disposed in the longitudinal direction of the vehicle.

Sprung swinging steering axles employing several physically separated spring elements are known, the various spring elements requiring to be matched to one another, which arrangements are relatively complex and occupy a great deal of space, factors which are a particular disadvantage in vehicles such as fork lift trucks because of the plurality of other pieces of equipment which have to be accommodated. Also, in the known designs the vertical spring travel is relatively large and this has an unfavorable effect upon the riding qualities, in particular in the case of fork lift trucks carrying loads with the lifting mechanism fully extended.

It is the aim of the invention to create a particularly simple and compact sprung swinging axle, which should as far as possible have a relatively short vertical spring travel and damping travel.

In accordance with the invention, a truck axle is equipped with a pivot pin about which it may swing in an axis extending longitudinally of the truck frame, and there are pivot means mounting the axle and pivot pin so as to move substantially in a vertical direction while pivoting about a point on the truck frame. Also, there are yielding means acting between the axle and truck frame to oppose the movements of the pin and axle so as to contribute a yielding support for the axle.

More particularly, the point about which the axle pivots relatively to the frame on the pivot means is located in displaced relation to the axis of wheels that are mounted on the axle. That point may be termed a secondary pivot point and the movements about the secondary pivot point are in the longitudinal central plane of the vehicle. The pivot pin, about which the axle swings, is located in longitudinally displaceable fashion in the steering axle and engages at that of its ends remote from the said secondary pivot point with an inclined cam surface on the vehicle frame, forming cam means between the axle and frame. Acting between the pivot pin and the axle is a spring which receives the reaction forces transmitted through the point of contact between said inclined face of the vehicle frame and the pin.

Due to this design, it is possible to make do with a single relatively small spring, which is highly favorable since it can be accommodated in particularly compact manner on the steering axle, and it is furthermore of special importance that there is no longer any need for the mutual matching of physically separate individual spring elements. Self-evidently, the spring thus located at one point, can be comprised of different spring elements having different spring characteristics, in order to achieve particularly good springing and damping characteristics.

To establish the secondary pivot point, there may be a fixed pivot in the vehicle frame, disposed transversely of the longitudinal axis of the vehicle, and about which a lever rotatably attached to the axle can pivot in the vertical plane. The effect of this is that as a function of the working deflection of the spring, the axle will execute an arcuate deflecting movement about the center of the transverse pivot, meaning that the spring deflection or vertical damping travel of the axle has a certain horizontal component, so that the riding quality of a vehicle equipped with a swinging axle in accordance with the invention is influenced in a highly advantageous way.

However, the secondary pivot point may also be in the form of a ball joint carried on the vehicle frame on the longitudinal axis of the primary pivot pin, and this provides the facility for arranging steering linkage in the steering axle body between the primary pivot pin and the ball joint, so that a particularly low installed steering axle height is achieved. In particular, the flatter construction of the steering axle obtained in this way means that less space is needed above the axle center.

In both embodiments of the invention so far described, a compression spring concentrically surrounding the primary pivot pin can be provided, this spring seating at one end against a thrust bearing fixed to the pin and at the other end against a thrust bearing fixed to the steering axle.

It is advisable to provide at least one roller at that end of the primary pivot pin which bears against the vehicle frame, the roller running between lateral guide surfaces on the inclined face formed on the frame.

Also, a stop can be provided which limits the longitudinal movement of the pivot pin under the action of the compression spring, the stop preferably being at the bottom end of the inclined face on the vehicle frame.

A further essential advantage of the design proposed in accordance with the invention resides in the fact that using it, a load indication can be achieved in a very simple and advantageous manner. For example, weighing devices for fork lift trucks are known, which can be operated by the fluid pressure developed in the jacking cylinder of the lifting mast, this pressure being a static load-dependent factor, when the vehicle is stationary and the jacking cylinder control valve is not operative. The moment arm of the load about the vehicle wheels, which is an important factor where the longitudinal stability of the vehicle is concerned. is not included in this load indication. Also, in these known devices, sufficiently accurate operation is only possible if the lifting mast is operating properly and if the forks or other load bearing arrangements are more or less uniformly loaded.

In accordance with the present invention, it is proposed that in order to indicate the load carried by the vehicle, a pressure-measuring device operated by the spring be used, and preferably this device will act as one of the thrust bearings of the spring when the latter is a compression spring.

With a design and arrangement of this kind, the load indication is in accordance with the vehicle stabilizing moment compared with the load moment, which is the product of the load and the distance of the load from the center of gravity. Also, the functional reliability and condition of the lifting mechanism in the case of a fork lift truck, have no effect upon the load indication and the lifting mast. A vertically movable load carriage need not be centrally loaded, so that advantages are obtained in the context of the use of certain kinds of auxiliaries such as pivotable crane jibs and side loaders.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception of which my disclosure is based may readily be utilized as a basis for the designing of other structures for carrying out the several purposes of my invention.

Referring now to the drawings.

Figure 1:
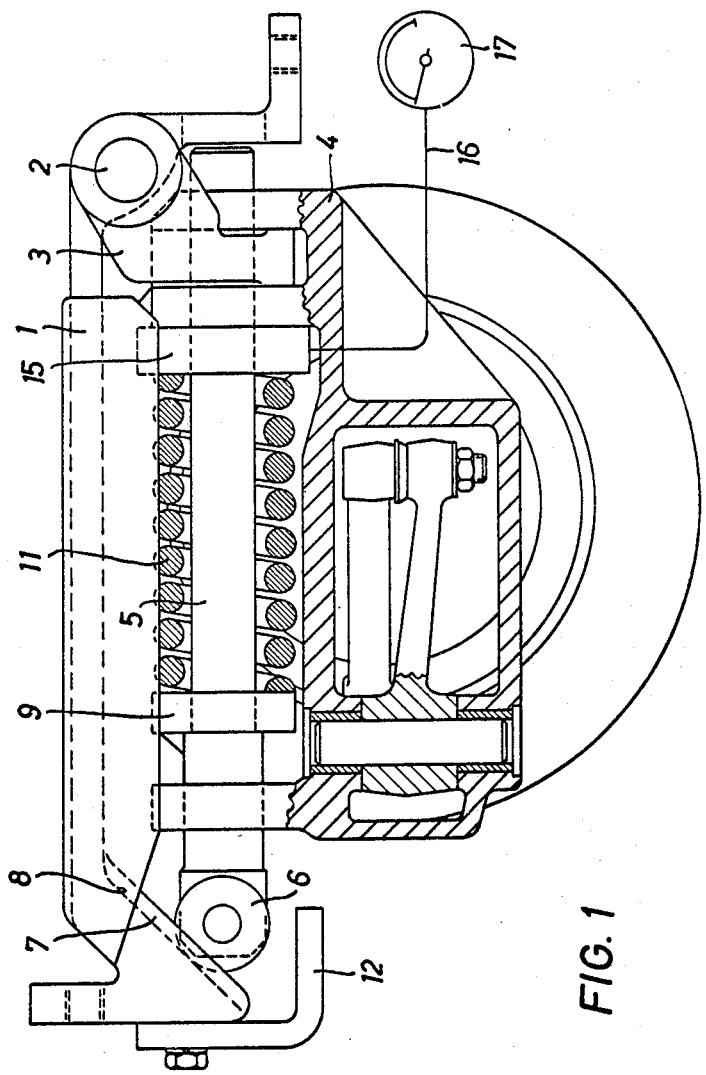
FIG. 1 is a partially sectioned side elevation of a sprung swinging steering axle in accordance with the invention.
Figure 2:
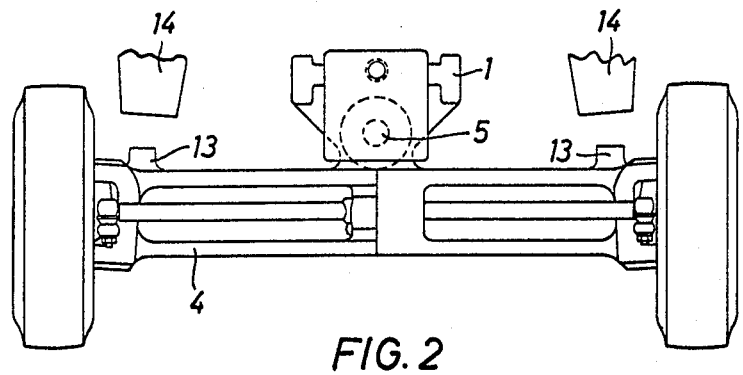
FIG. 2 is an end elevation of the swinging steering axle in accordance with FIG. 1.
Figure 3:
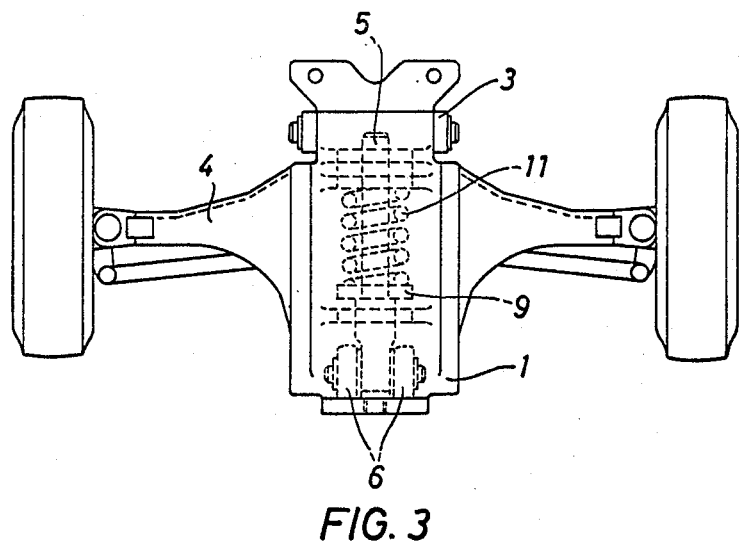
FIG. 3 is a plan view of a swinging steering axle in accordance with FIGS. 1 and 2.

In the emodiment of FIGS. 1 to 3, a bearing 1 is fixed to the vehicle frame (the latter is not shown in any detail), which bearing carries a pin 2 about which a lever 3 is pivotable, the lever 3 being rotatably attached to a steering axle 4 through a corresponding bearing therein as well as through the pivot pin 5 passing through the lever, the pivot pin being longitudinally displaceable in relation to the steering axle 4 and the lever 3.

The pivot pin 5 is provided with two rollers 6 at that of its ends opposite to the lever 3, those rollers bearing against an inclined cam surface 8 on the bearing 1 fixed to the vehicle frame, with which surface lateral guides 7 are associated.

The pivot pin 5 is fixed to a thrust bearing 9 near the end at which the rollers 16 are located, and its other end can move in an opening in a thrust bearing 15 that lies against a part of the steering axle 4. The thrust bearing 15 may be a load cell that will be utilized to offer a load indication, as I shall presently describe.

Encircling pivot pin 5 between the two thrust bearings 9 and 15, a coil compression spring 11 is located, and at the bottom end of inclined surface 8 a stop 12 is provided which limits the movement of the rollers 6 as produced by the compression spring 11.

The function of the steering axle in accordance with the construction I have described is as follows:

FIG. 1 illustrates the steering axle in the partial loaded central position. Due to the component of the reaction force of the rollers 6, acting on the inclined face 8, the pivot pin 5 slidably mounted in the steering axle 4 and in the lever 3 is axially loaded. This axial force has a reaction through the thrust bearing 9, the spring 11 and the thrust bearing 15, on the steering axle 4. In accordance with the particular load, whilst the vehicle is running, the steering axle will pivot about the center of the pin 2 to an extent such that the axial force acting on the pin 5 is in equilibrium with the force provided by the compression spring 11. The initial position of the pivot pin 5 is determined by the stop 12 when the steering axle is completely unloaded, and its final position when taking a high shock loading, is determined by the coil bound length of the compression spring 11.

As FIG. 2 shows, the swing of the steering axle is limited by cooperation between extensions 13 on the steering axle 4 and corresponding stops 14 on the vehicle frame.

When thrust bearing 15 is a load cell, the cell may be of an electric or hydraulic type, and is connected through a line 16 with an indicating instrument 17.

The particular axial force acting upon the pivot pin 5 reacts through the thrust bearing 9, the compression spring 11 and the load cell 15, on the steering axle 4. When the vehicle supports no load, the pressure on load cell 15 will be such that the instrument 17 will indicate that fact. At the maximum load moment determined by the minimum longitudinal stability of the vehicle, the instrument 17 indicates that the safe limit has been reached. Where load indications are not desired, a simple thrust bearing naturally may take the place of the load cell 15, and therefore it is to be be understood that my invention is not to be limited by a load cell.

Figure 4:
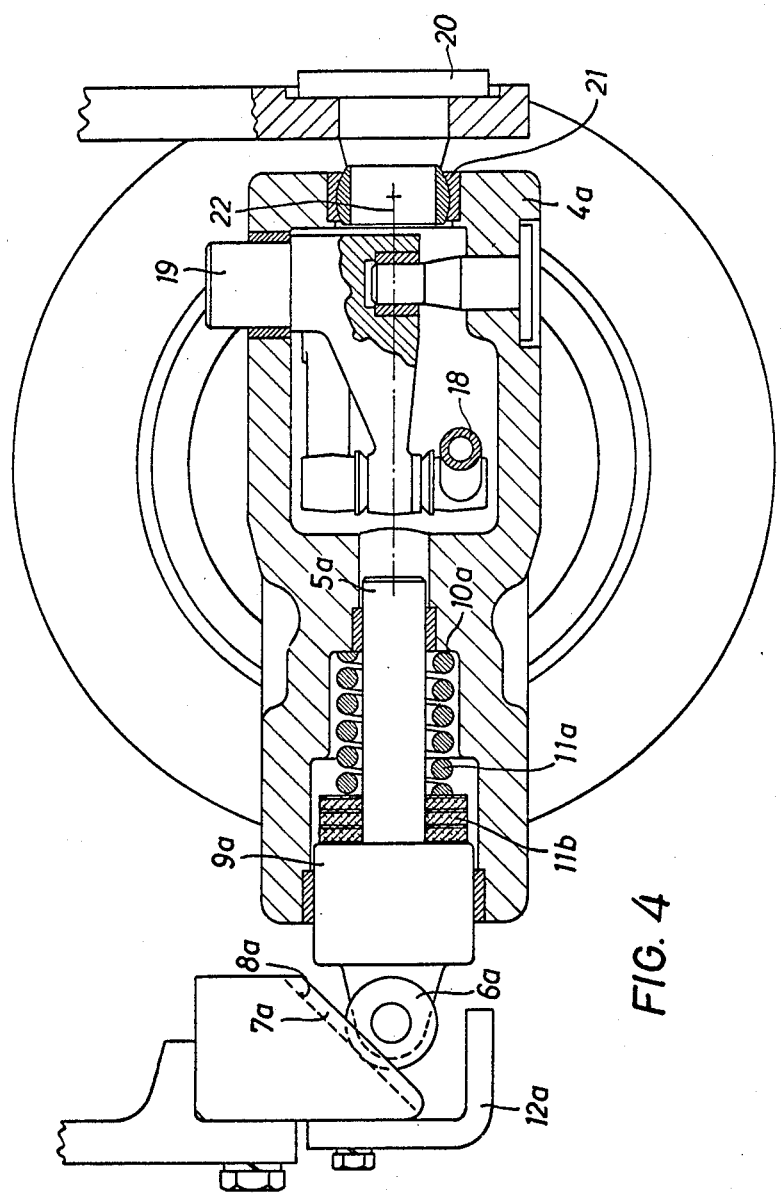
FIG. 4 is a side elevation similar to that of FIG. 1, of a slightly modified embodiment of the invention.
Figure 5:
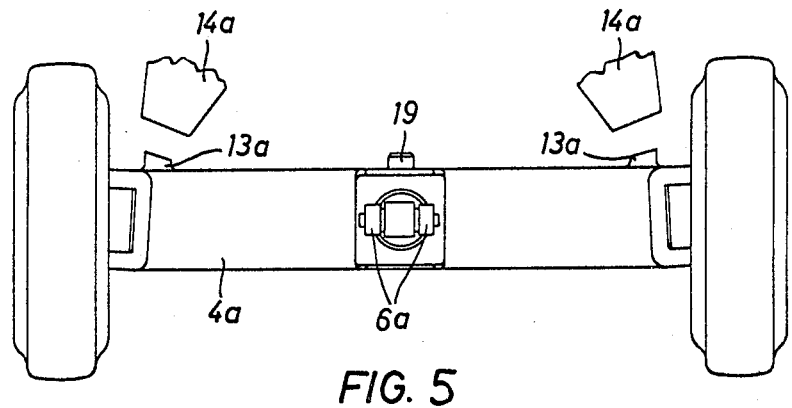
FIG. 5 is an end elevation of the swinging steering axle in accordance with FIG. 4.
Figure 6:
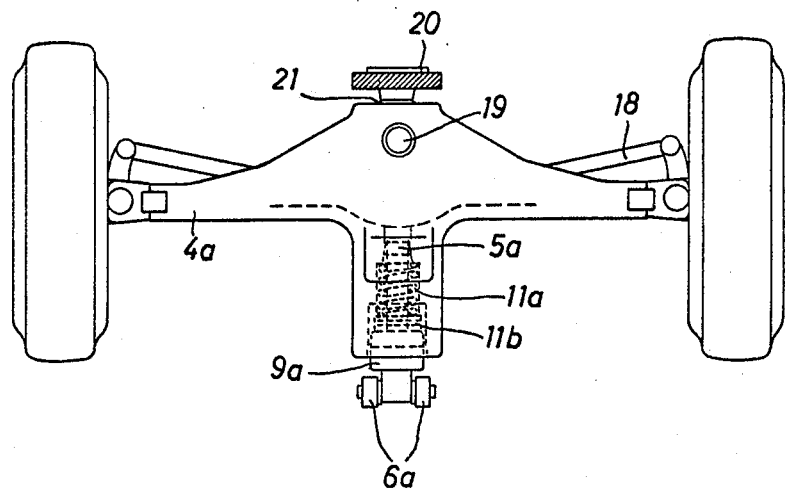
FIG. 6 is a plan view of a swinging steering axle in accordance with FIGS. 4 and 5.

The embodiment of FIGS. 4 to 6 is so contrived that the least possible installed height of the steering axle is obtained. To this end, steering linkage 18 including steering arms 19 is arranged inside the steering axle 4a between the pivot pin 5a and the secondary pivot for pivoting of the axle in the longitudinal central plane of the vehicle. The secondary pivot here is in the form of a ball joint 21 carried on a part 20 of the vehicle frame, the center of which joint lies on the longitudinal axis 22 of the pin 5a.

All the remaining components correspond substantially to the design set out in FIGS. 1 to 3, though I do show a two-part spring acting between pivot pin 5a and steering axle 4a, including a coil compression spring 11a and a rubber spring 11b of laminated design, the seating being on the one hand against a thrust bearing 9a on the pin 5a and on the other hand against a thrust bearing 10a on the steering axle 4a. The remaining components corresponding to the design of FIGS. 1 to 3 are given the suffix a in the embodiment of FIGS. 4 to 6.

It can be seen that the function of the axle in accordance with FIGS. 4 to 6 corresponds entirely with the aforedescribed function of the axle in accordance with FIGS. 1 to 3. The only difference is that as a consequence of the provision of the ball joint 21 on the longitudinal axis 22 of the pin 5a, the spring deflection and vertical damping travel of the vehicle have a much smaller horizontal component, but that fact is of minor importance in those cases where the attainment of the least possible installed height of the steering axle is desired.

It will be understood of course that a pressure-measuring device can also be provided in the case of the embodiment of FIGS. 4 to 6, in the same way as has been explained in association with the FIG. 1, since all that has to be done for this purpose is to design one of the thrust bearings 9a or 10a as a load cell.

I now claim:

1. In an industrial truck, a wheel supporting axle, a pivot pin assembled to the axle and about which said axle may swing in an axis extending longitudinally of the truck frame, pivot means mounting the axle and its pivot pin so as to move substantially in a vertical direction while pivoting about a point on the truck frame, and while permitting the swinging of the axle about said pivot pin, yielding means acting between said axle and the truck frame and including a spring mounted to press in a direction extending longitudinally of the truck frame, and means applying the longitudinal pressure of the spring in a vertical direction to the frame, opposing the vertical movements of the axle about the pivot pin whereby to contribute a yielding mounting for the axle.

2. The construction set forth in claim 1, in which the axle is a steering axle, and is formed with an opening for accepting a steering linkage, and a steering linkage extending in said opening and assembled relatively to the axle.

3. The construction set forth in claim 1, in which said yielding means act at a point which is displaced in a longitudinal direction on the truck relatively to said point on which the axle pivots on the truck frame.

4. The construction set forth in claim 1, in which said pivot pin is mounted for endwise movements, said spring pressing the pivot pin on its mounting, and cam means through which the spring pressure of the pivot pin acts against the truck frame.

5. The construction set forth in claim 4, in which said cam means are displaced longitudinally on the truck relatively to said point about which the axle pivots on the truck frame.

6. The construction set forth in claim 1, including surfaces mounting the pivot pin for sliding movement on the axle, said spring being a coil spring encircling said pivot pin, thrust bearings between which said spring acts to press said pin endwise on its mounting relatively to the axle, and an inclined cam surface through which a part on the pivot pin applies the endwise pressure of said pin to the truck frame, said spring accepting a predetermined portion of a load applied through the swinging axle.

7. The construction set forth in claim 6, in which said inclined cam surface and said part on the pivot pin coact at points that are displaced in one direction from the axis in which wheels rotate on the axle, and the pivot point of said pivot means being displaced in an opposed direction from said wheel axis.

8. The construction set forth in claim 6, including a load cell forming a thrust bearing for said spring and through which the spring may actuate an indicating instrument so as to indicate the axle load.

9. In the construction set forth in claim 1, a lever rotatable on said pivot means and supporting one end portion of said pivot pin, and said yielding means including a part coacting with the truck frame on the opposed end portion of the pivot pin.

10. In the construction set forth in claim 1, a ball joint forming said pivot means and engaging the axle at a location which is in aligned relation to said pivot pin, said yielding means including a part coacting with the truck frame on that end portion of the pivot pin which is more remote from said ball joint.

11. The construction set forth in claim 10, in which the axle is a steering axle, said axle being formed intermediate the aligned ball joint and pivot pin with an opening for accepting a steering linkage, and a steering linkage extending in said opening and assembled to the axle.

References Cited

UNITED STATES PATENTS

| | | | |
|---|---|---|---|
| 2,835,507 | 5/1958 | Davies | 280—112 |
| 2,998,980 | 9/1961 | Ulinski | 280—112 |
| 3,014,736 | 12/1961 | Moreno et al. | 280—112 |
| 3,133,745 | 5/1964 | Granning | 280—112 |
| 3,243,198 | 3/1966 | Simovich | 280—112 |

KENNETH H. BETTS, Primary Examiner

U.S. Cl. X.R.
267—20; 280—112